US007748190B1

(12) United States Patent  (10) Patent No.: US 7,748,190 B1
Loper  (45) Date of Patent: Jul. 6, 2010

(54) CLEAT

(76) Inventor: Thomas Loper, 1000 Sheridan St., Chicopee, MA (US) 01022

( * ) Notice: Subject to any disclaimer, the term of this patent is extended or adjusted under 35 U.S.C. 154(b) by 98 days.

(21) Appl. No.: 11/865,907

(22) Filed: Oct. 2, 2007

Related U.S. Application Data

(60) Provisional application No. 60/827,779, filed on Oct. 2, 2006.

(51) Int. Cl.
*E04D 1/00* (2006.01)
(52) U.S. Cl. .............................. 52/520; 52/543; 52/548; 52/715; 411/466
(58) Field of Classification Search .................. 52/548, 52/520, 543, 518, 715, 519, 547, 549, 551, 52/552; 411/466, 467, 468
See application file for complete search history.

(56) References Cited

U.S. PATENT DOCUMENTS

| 23,000 | A | | 2/1859 | Pollard | |
|---|---|---|---|---|---|
| 255,087 | A | | 3/1882 | Sagendorph | |
| 620,349 | A | * | 2/1899 | McDowell | .................... 52/715 |
| 830,216 | A | | 9/1906 | Ducker | |
| 1,185,231 | A | * | 5/1916 | Miller | ......................... 217/70 |
| 1,412,186 | A | | 4/1922 | Limerick | |
| 1,470,251 | A | * | 10/1923 | Ahlvin | ....................... 403/281 |
| 1,540,960 | A | | 6/1925 | Sherman | |
| 1,600,667 | A | | 9/1926 | Fischer | |
| 1,755,538 | A | | 4/1930 | Draughon Jr. | |
| 1,978,519 | A | | 10/1934 | Willock, at al. | |
| 2,231,008 | A | * | 2/1941 | Ochs | ........................... 52/536 |
| 2,232,075 | A | * | 2/1941 | Nevin | ........................... 52/540 |
| 2,264,546 | A | | 12/1941 | Ochs | |
| 2,877,520 | A | | 3/1959 | Jureit | |
| 3,479,919 | A | | 11/1969 | Lidsky | |
| 3,529,918 | A | * | 9/1970 | Jureit | ........................ 411/466 |
| 3,738,076 | A | | 6/1973 | Kessler | |
| 3,797,179 | A | * | 3/1974 | Jackson | ...................... 52/90.1 |
| 3,824,756 | A | | 7/1974 | Kessler | |
| 4,157,676 | A | * | 6/1979 | Jureit | ........................ 411/458 |
| 4,486,115 | A | * | 12/1984 | Rionda et al. | ............... 403/283 |
| 5,050,357 | A | | 9/1991 | Lawson | |
| 5,060,434 | A | * | 10/1991 | Allison | ...................... 52/238.1 |
| 5,542,226 | A | | 8/1996 | Markovich | |
| 5,632,128 | A | * | 5/1997 | Agar | ......................... 52/489.2 |
| 6,170,215 | B1 | | 1/2001 | Nasi | |
| 6,171,043 | B1 | * | 1/2001 | Williams | .................... 411/466 |
| 6,299,378 | B1 | * | 10/2001 | Griffith | ....................... 403/293 |
| 7,117,651 | B2 | * | 10/2006 | Beck | ........................... 52/553 |
| 2004/0074188 | A1 | | 4/2004 | Beck et al. | |

* cited by examiner

*Primary Examiner*—Richard E Chilcot, Jr.
*Assistant Examiner*—Anthony N Bartosik
(74) *Attorney, Agent, or Firm*—Doherty, Wallce, Pillsbury & Murphy, P.C.; Deborah A. Basile; Karen K. Chadwell

(57) ABSTRACT

A cleat for tying together two or more structural elements in either one or both of a horizontal and a vertical plane. The cleat comprises a first set of protrusions located on a first half of a plate, and a second set of protrusions located on a second half of the plate, wherein the first set of protrusions are mirror images of the second set of protrusions. Additionally, both the first and second set of protrusions are arranged in rows, wherein each successive row comprises protrusions having a height less than the height of the protrusions located in the immediately preceding row. Furthermore, the protrusions in the various rows are staggered in position relative to the protrusions located in the other rows.

9 Claims, 2 Drawing Sheets

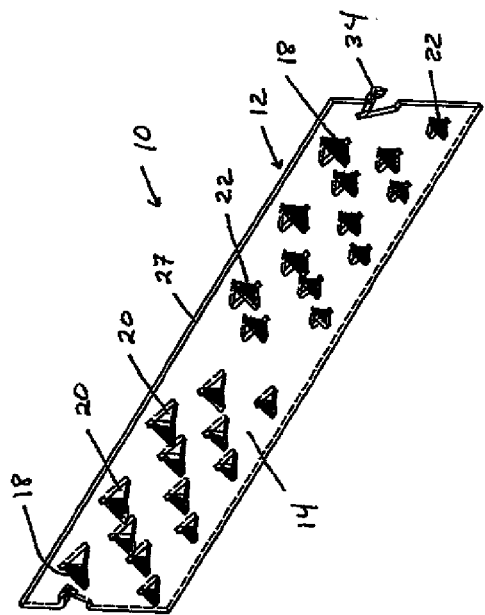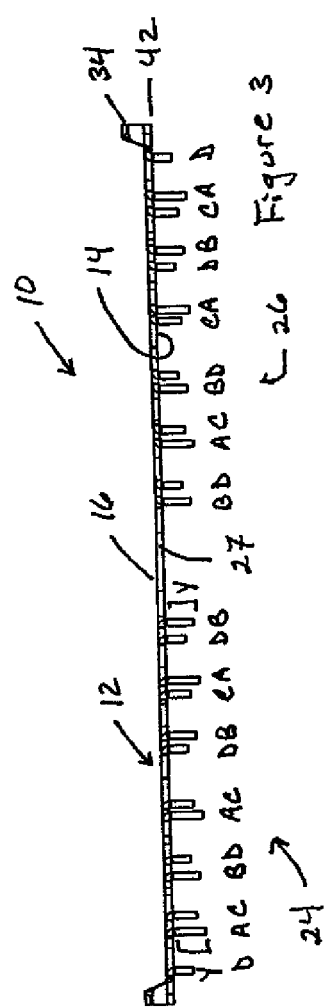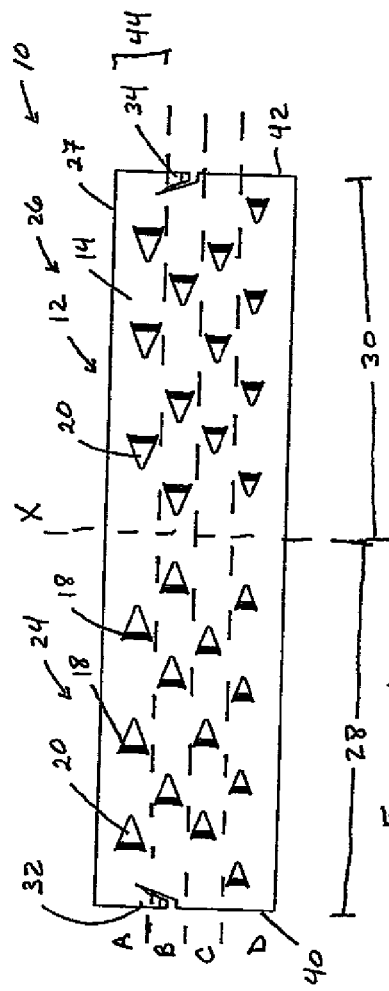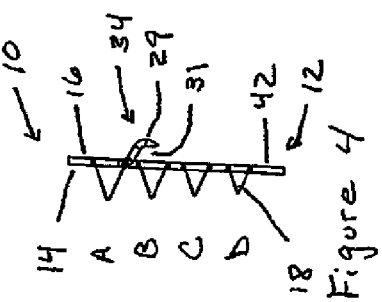

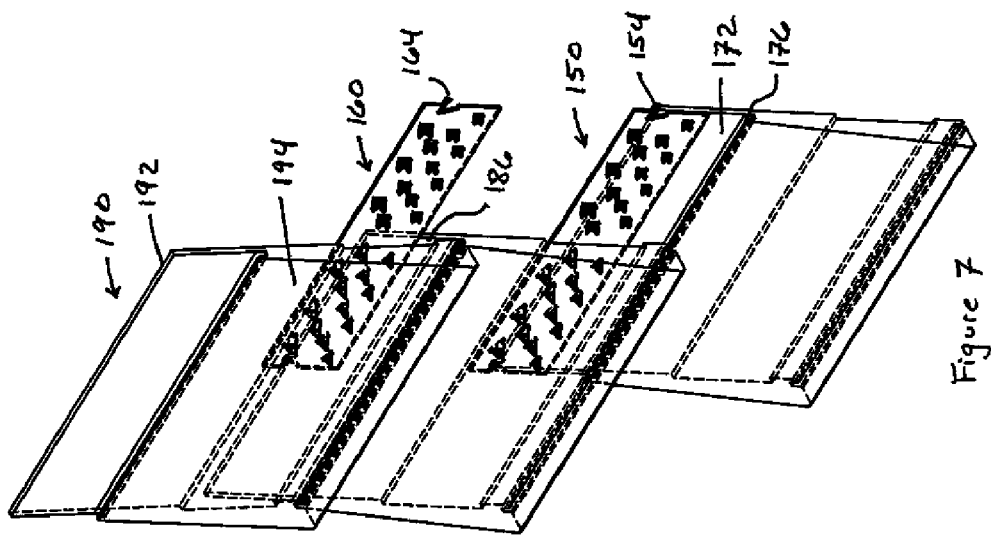
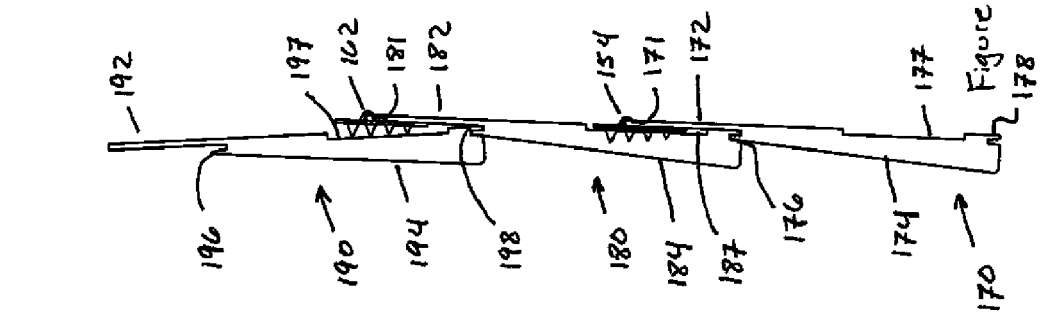
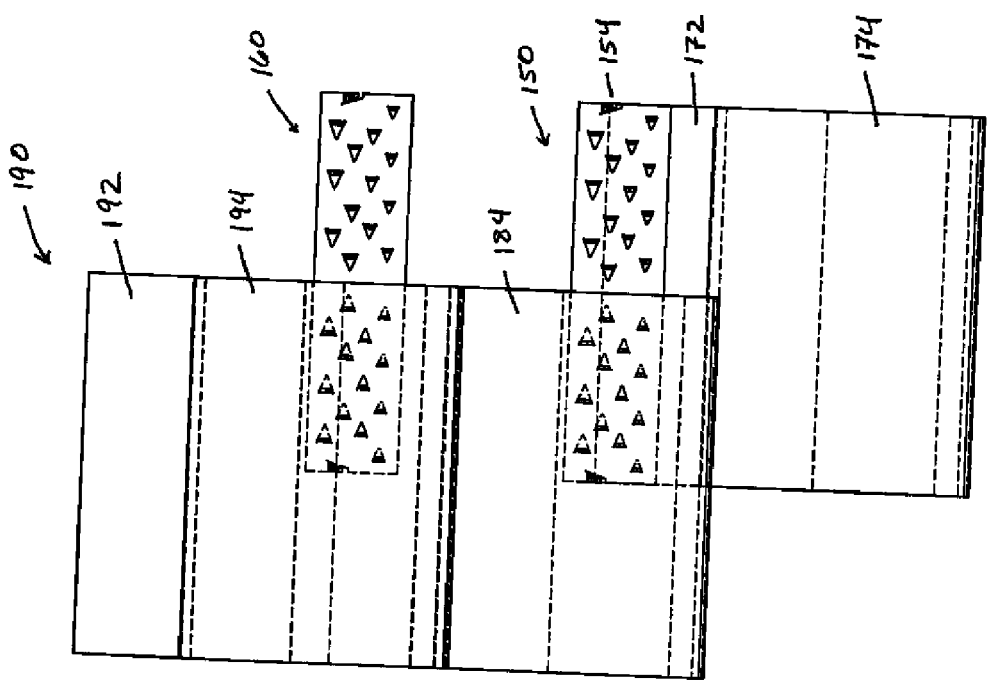

CLEAT

CROSS REFERENCE TO RELATED APPLICATIONS

This application claims the benefit of U.S. Provisional Application No. 60/827,779 filed on Oct. 2, 2006.

BACKGROUND OF THE INVENTION

1. Field of the Invention

The present invention relates to a cleat. More particularly, this invention relates to a cleat comprising a plurality of protrusions arranged to hold two or more structural members together.

2. Background

Structural members, such as clapboards used for siding, have a natural tendency to expand and contract when exposed to ambient temperatures. This expansion and contraction proves problematic over time as the contraction creates large spaces between the clapboards, thereby exposing the underlying structural elements to the environment, and increasing the likelihood of structural damage to the structural elements, and the expansion creates stress on abutting clapboards, thereby contributing to the structural damage of the clapboards. Therefore, what is needed is a tying member or cleat that can hold two or more structural members together, such that when the structural members expand or contract, the members expand or contract as a cohesive unit, thereby reducing the overall stress to which the structural members are exposed, and, therefore increasing the longevity of both the structural members and the underlying structural elements which the structural members are designed to cover and protect.

SUMMARY OF THE INVENTION

The above-discussed and other drawbacks and deficiencies of the prior art are overcome or alleviated by a cleat for securing structural members, such as clapboards used as siding, particularly siding clapboards comprising cellular polyvinylchloride, together. The cleat comprises a plurality of protrusions disposed on a plate, wherein the plurality of protrusions are sunk or dug into the structural member to hold or tie the structural member to an abutting structural member.

The plurality of protrusions are divided into a first set of protrusions located on a first half of the plate, and a second set of protrusions located on a second half of the plate, wherein the first set of protrusions are mirror images of the second set of protrusions. Additionally, both the first and second set of protrusions are arranged in rows, wherein each successive row comprises protrusions having a height less than the height of the protrusions located in the immediately preceding row. By varying the length or height of the protrusions by row, the structural members can be more easily aligned with each other prior to sinking the structural members into the protrusions; additionally, the variability in height reduces the overall strain on the structural members when interlocking the structural members to the cleat.

Furthermore, the protrusions in the various rows are preferably staggered in position relative to the protrusions located in the other rows; that is, the protrusions in each row are not directly aligned with the protrusions in at least the immediately subsequent row, and even more preferably, any row. By staggering the position of the protrusions, the overall stress caused by piercing the structural member with the protrusions is distributed over a greater surface area of the clapboard, thereby diffusing the stress, and better preserving the integrity of the structural member.

The cleat is a further improvement over the prior art in that it allows for the tying together of two more structural members along both a horizontal and a vertical plane. In this manner, then, the number of structural members held together by a single cleat can be increased. Additionally, the cleat of the present invention allows two or more structural members to move together as a single unit when the structural members expand and contract when exposed to the ambient temperature of their working environment.

Other objects and advantages of the present invention will become obvious to persons of ordinary skill in the art, and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

FIG. 1 is a schematic depicting a front side of an exemplary cleat;

FIG. 2 is a schematic depicting a view along a longitudinal top side edge of the front side of the cleat depicted in FIG. 1;

FIG. 3 is a schematic depicting a view along a side edge of the cleat depicted in FIGS. 1 and 2;

FIG. 4 is a schematic depicting a latitudinal view of the cleat depicted in FIGS. 1-3; and FIGS. 5-7 are schematics depicting an exemplary application of exemplary cleats.

DETAILED DESCRIPTION OF THE INVENTION

The cleat of the present invention comprises a plurality of protrusions arranged to securely hold two or more structural members together. In an exemplary embodiment, the structural members comprise clapboards, and especially clapboards to be used as siding, and more especially siding clapboards comprising cellular polyvinylchloride ("cellular PVC"). The cleat of the invention is described with reference to the figures, however, the cleat shall in no way be limited to the embodiments described or depicted in the figures, but shall also contain various modifications and variations thereof.

Referring to FIGS. 1-4, a cleat 10 comprises a plate 12 comprising a front side 14 opposite to a back side 16. Extending perpendicularly from plate 12 is a plurality of V-shaped protrusions 18, wherein the apex of the V of each V-shaped protrusion 18 is directed upwards and away from front side 14.

In an exemplary embodiment, each protrusion 18 is cut from plate 12 to form the legs and apex of V-shaped protrusion 18, and then raised from front side 14 such that a base region 22 of the protrusion remains integrally attached to plate 12, thereby resulting in a perforation 20 configured with the same geometrical configuration as that of the protrusion. Perforations 20 facilitate diffusing the stress created when cleat 10 is pierced into the structural member.

Plate 12 is divided evenly along a vertical axis X to form a first half 28 and a second half 30. Accordingly, plurality of protrusions 18 is divided into a first set 24 and a second set 26, wherein first set 24 is located on first half 28 of plate 12 and second set 26 is located on second half 30 of plate 12, wherein the arrangement and configuration of first set 24 is a mirror image of second set 26. Accordingly, as the two sets 24 and 26 are mirror images of each other, the subsequent discussion of cleat 10 will make only reference to first set 24, wherein it is to be understood that the spatial relationship of the various protrusions discussed with reference to first set 24 is equally applicable to the protrusions forming second set 26 with the understanding that second set 26 is the mirror image of first set 24.

Referring now to first set 24 of protrusions, the protrusions are further categorized according to the row in which each protrusion is located. For example, a first group of protrusions extends horizontally across front side 14 to form a row A, a second group of protrusions extends horizontally across front side 14 to form a row B, a third group of protrusions extends horizontally across front side 14 to form a row C, and a fourth group of protrusions extends horizontally across front side 14 to form a row D. Starting with row A, the protrusions in each of rows A-D comprise a height, as defined by Y, greater than the height of the protrusions contained in the immediately succeeding row. Accordingly, the protrusions contained in row A comprise a height greater than the height of the protrusions contained in row B, which comprise a height greater than the height of the protrusions contained in row C, which in turn comprise a height greater than the height of the protrusions contained in row D.

Additionally, the rows of protrusions are staggered, and the protrusions in each row are spaced, such that when cleat 10 is viewed from its longitudinal side, the protrusions from the following rows are visible in the following sequence: D AC BD AC DB CA DB BD AC BD CA DB CA D (see FIG. 3—note that this sequence includes both the first and second set of protrusions 24 and 26). That is, if the protrusions are viewed in sequence from a longitudinal top side edge 27 of cleat 10, the first protrusion in sequence would be the first protrusion in first set 24, row D; the second protrusion in sequence would be the first protrusion in first set 24, row A; the third protrusion in sequence would be the first protrusion in first set 24, row C; the fourth protrusion in sequence would be the first protrusion in first set 24, row B; the fifth protrusion in sequence would be the second protrusion in first set 24, row D; etc. The staggered layout of the various rows helps to distribute the stress over the structural member when the protrusions from cleat 10 are pierced into the structural member.

Cleat 10 further comprises flanges 32 and 34 located towards a top region 44 of plate 12 and formed respectively from side edges 40 and 42 of plate 12. Preferably, flanges 32 and 34 are positioned such that, when properly used to join two or more clapboards, all of the rows of the protrusions are sunk onto a back side of a base of a clapboard (as will be discussed with reference to FIGS. 5-7). In an exemplary application, flanges 32 and 34 are used to mount cleat 10 to a top edge of an overhang of a clapboard. As shown in the figures, flanges 32 and 34 are cut from respective side edges 40 and 42 of plate 12 to form a hooked protrusion 29 which extends from plate 12 to form a groove 31 between hooked protrusion 29 and back side 16 of plate 12. As will be explained in further detail below, hooked protrusion 29 is shaped to latch on to a top edge of the clapboard, wherein the top edge fits within groove 31.

An exemplary application of the cleat is now disclosed with reference to FIGS. 5-7. Referring to FIGS. 5-7, cleats 150 and 160 are used to secure clapboards 170, 180, and 190 into position. For example, each of clapboards 170, 180, and 190 respectively comprises an overhang strip 172, 182, and 192 which joins a base 174, 184, and 194 to form a groove 176, 186, and 196 which extends along the length of clapboards 170, 180, and 190. Additionally, bases 174, 184, and 194 of each of clapboards 170, 180, and 190 comprise a tongue 178, 188, and 198 which extends along a length of respective back surfaces 177, 187, and 197 of bases 174, 184, and 194.

Cleat 150 is attached to overhang strip 172 by hanging flanges 152 and 154 of cleat 150 over a top edge 171 of overhang strip 172 such that cleat 150 extends across a surface length of overhang strip 172. Tongue 188 of clapboard 180 is fitted into groove 176 of clapboard 170 while back surface 187 of clapboard 180 is pressed against the protrusions located on the first half of cleat 150 until clapboard 180 is firmly secured thereto. The protrusions located on the second half of cleat 150 remain exposed for the attachment of an additional clapboard (not shown).

Once clapboard 180 is secured into place, cleat 160 may be positioned onto a top edge 181 of overhang strip 182 via flange 162. Tongue 198 of clapboard 190 may then be inserted into groove 186 of clapboard 180 and back surface 197 of clapboard 190 may be pressed against the protrusions located on the first half of cleat 160 until clapboard 190 is firmly secured thereto. The protrusions located on the second half of cleat 160 remain exposed for the attachment of an additional clapboard (not shown).

Additional clapboards (not shown) may then be positioned onto the exposed protrusions according to the method disclosed above. In this manner, then, the cleat of the present invention binds together two or more clapboards in both a horizontal and a vertical orientation.

It is noted that as the protrusions located in different rows of cleats 150 and 160 have varying heights, the depth to which the protrusions are pressed into the clapboard vary. That is, the protrusions which are located on the top row, i.e., the protrusions having the greatest heights, sink into a greater depth of the clapboard as compared to the protrusions located in the other rows, wherein each subsequent row penetrates into the clapboard at a lesser depth than the row of protrusions immediately preceding that particular row. The difference in the height of the protrusions allows the clapboard to be more easily lined up with the cleat prior to pressing the clapboard into the cleat. That is, if the protrusions of the various rows had equal heights, alignment would be more challenging, and there would be too much pressure on the tongue of the clapboard that is being inserted into the groove of the previously installed clapboard. Also, by sinking the top rows of protrusions more deeply into the clapboards, the attached clapboards act as a more cohesive unit, such that the boards move as if they were one, thereby accommodating the natural expansion and contraction of the clapboards with changes in ambient temperature. Without the cleat, the clapboards tend to pull away from each other as they contract.

Furthermore, as made clear in FIGS. 5-7, the configuration of the protrusions in the inventive cleat allows for the attachment of clapboards and other structural members via a single cleat along both a vertical and a horizontal plane. Additionally, the arrangement allows a single cleat to directly hold together two or more structural members, wherein the direct holding of three structural members is particularly preferred.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An interconnected clapboard system comprising:
   a first clapboard and a second clapboard, wherein each of the first clapboard and the second clapboard comprises:
   a front side opposite to a back side, wherein the front side comprises a groove formed at a border between an overhang strip of the clapboard and a base of the clapboard, wherein the overhang strip comprises a top edge which defines an uppermost portion of the clapboard, and wherein the base defines a lowermost portion of the clapboard, and further wherein the back side of the base comprises a tongue; and
   a cleat comprising:
      a plate comprising a planar front side opposite to a planar back side, wherein the plate is equally divided crosswise into a first half and a second half, wherein the first half comprises an exposed lateral edge and the second half comprises an exposed lateral edge, wherein the two exposed lateral edges are opposite to each other, and further wherein each of the first half and the second half of the plate comprises:
      a plurality of protrusions, wherein each protrusion extends from the planar front side at a base region and terminates at a tip, wherein a distance between the base region of each protrusion and its respective tip comprises a height of the respective protrusion; and wherein
      the plate further comprises a first flange extending from the exposed lateral edge of the first half of the plate, and a second flange extending from the exposed lateral edge of the second half of the plate, wherein each of the first flange and the second flange extend from the back side of the plate, and wherein each of the first flange and the second flange comprises a hooked portion separated from the back side of the plate by a groove;
   wherein the protrusions on the first half of the plate are sunk into the back side of the base of the first clapboard, and wherein the hooked portion of the first flange is positioned over the top edge of the overhang strip of the second clapboard such that the top edge of the overhang strip of the second clapboard fits within the groove of the cleat which is formed between the hooked portion of the first flange and the back side of the plate, and the back side of the plate faces the front side of the overhang strip of the second clapboard, and further wherein the tongue of the first clapboard is disposed within the groove of the second clapboard.

2. The system of claim 1, further comprising a third clapboard comprising:
   a front side opposite to a back side, wherein the front side comprises a groove formed at a border between an overhang strip of the third clapboard and a base of the third clapboard, wherein the overhang strip of the third clapboard comprises a top edge which defines an uppermost portion of the third clapboard, and wherein the base defines a lowermost portion of the third clapboard;
   wherein the protrusions on the second half of the plate of the cleat are sunk into the back side of the base of the third clapboard.

3. The system of claim 2, wherein the plurality of protrusions on each of the first half and the second half of the plate of the cleat are arranged in rows, wherein each protrusion in a particular row has a height that is identical to the other protrusions in the shared row, and wherein each row of protrusions has a height that is different from the height of the protrusions in the other rows.

4. The system of claim 3, wherein each successive row of protrusions comprises a height that is less than the immediately preceding row of protrusions.

5. The system of claim 4, wherein the plate further comprises a plurality of perforations formed through the plate by cutting and bending the plurality of protrusions upwards directly away from the front side of the plate.

6. The system of claim 5, wherein the plurality of protrusions located on the first half of the plate are mirror images of the plurality of protrusions located on the second half of the plate.

7. The system of claim 6, wherein:
   each of the protrusions on the first half of the plate are positioned such that none of the base regions of the protrusions on the first half of the plate lie on a same vertical plane as the other base regions of the protrusions on the first half of the plate, and further wherein:
   each of the protrusions on the second half of the plate are positioned such that none of the base regions of the protrusions on the second half of the plate lie on a same vertical plane as the other base regions of the protrusions on the second half of the plate.

8. The system of claim 7, wherein the first clapboard, the second clapboard, and the third clapboard comprise cellular polyvinylchloride.

9. The system of claim 2, wherein the back side of the base of the third clapboard comprises a tongue, wherein the tongue of the third clapboard is disposed within the groove of the first clapboard.

* * * * *